United States Patent
Chung et al.

(10) Patent No.: US 7,904,367 B2
(45) Date of Patent: *Mar. 8, 2011

(54) CREDIT PORTFOLIO BENCHMARKING SYSTEM AND METHOD

(75) Inventors: Charles S. Chung, Tai Tam (HK);
Linda A. Haran, Santa Ana, CA (US);
Angela Granger, Irvine, CA (US);
Patricia Cheryl Lassen, Orange, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/718,701

(22) Filed: Mar. 5, 2010

(65) Prior Publication Data

US 2010/0274734 A1   Oct. 28, 2010

Related U.S. Application Data

(63) Continuation of application No. 11/475,428, filed on Jun. 26, 2006, now Pat. No. 7,676,418.

(60) Provisional application No. 60/693,757, filed on Jun. 24, 2005.

(51) Int. Cl.
*G06Q 40/00*   (2006.01)

(52) U.S. Cl. ............. 705/36 R; 705/4; 705/36; 707/201; 370/241

(58) Field of Classification Search .................... 705/35; 707/10; 706/12; 463/42; 701/117
See application file for complete search history.

(56) References Cited

U.S. PATENT DOCUMENTS

| | | |
|---|---|---|
| 5,013,038 A | 5/1991 | Luxenberg et al. |
| 5,630,127 A | 5/1997 | Moore et al. |
| 5,666,528 A | 9/1997 | Thai |
| 5,797,136 A | 8/1998 | Boyer et al. |
| 5,822,751 A | 10/1998 | Gray et al. |
| 5,884,287 A | 3/1999 | Edesess |

(Continued)

FOREIGN PATENT DOCUMENTS

WO   WO 99-46710   9/1999

(Continued)

OTHER PUBLICATIONS

Dan DiBartolomeo, Portfolio Optimization: The Robust Solution, Dec. 21, 1193(DiBartolomeo).*

(Continued)

*Primary Examiner* — Ella Colbert
*Assistant Examiner* — Chika Ojiaku
(74) *Attorney, Agent, or Firm* — Knobbe Martens Olson & Bear LLP

(57) ABSTRACT

A portfolio benchmarking system comprises a repository of trade data, a repository of consumer data, a build computer, and a benchmarking query application. The repository of trade data comprises a plurality of data items regarding trade lines. The repository of consumer data comprises a plurality of data items regarding consumers, wherein at least some information in the consumer data is not in the trade data and at least some information in the trade data is not in the consumer data. The build computer periodically generates at least one data file comprising a plurality of data items, each data item combining information from the trade data and the consumer data, such that searches can be performed on the combined data without joining trade data and consumer data at query run time. The benchmarking query application executes queries on the data file generated by the build computer.

21 Claims, 12 Drawing Sheets

U.S. PATENT DOCUMENTS

| | | | |
|---|---|---|---|
| 5,940,812 | A | 8/1999 | Tengel et al. |
| 5,963,932 | A | 10/1999 | Jakobsson et al. |
| 5,974,396 | A | 10/1999 | Anderson et al. |
| 6,070,147 | A | 5/2000 | Harms et al. |
| 6,144,957 | A | 11/2000 | Cohen et al. |
| 6,182,060 | B1 | 1/2001 | Hedgcock et al. |
| 6,304,860 | B1 | 10/2001 | Martin et al. |
| 6,304,869 | B1 | 10/2001 | Moore et al. |
| 6,321,205 | B1 | 11/2001 | Eder |
| 6,393,406 | B1 | 5/2002 | Eder |
| 6,496,819 | B1 | 12/2002 | Bello et al. |
| 6,523,022 | B1 | 2/2003 | Hobbs |
| 6,574,623 | B1 | 6/2003 | Leung et al. |
| 7,386,466 | B2 | 6/2008 | McLean et al. |
| 2002/0169747 | A1 | 11/2002 | Chapman et al. |
| 2003/0083893 | A1 | 5/2003 | Aliffi et al. |
| 2003/0097380 | A1 | 5/2003 | Mulhern et al. |
| 2004/0030629 | A1* | 2/2004 | Freeman et al. ............ 705/36 |
| 2004/0215584 | A1* | 10/2004 | Yao ............................ 706/12 |
| 2004/0220896 | A1* | 11/2004 | Finlay et al. ................ 707/1 |
| 2004/0243450 | A1* | 12/2004 | Bernard et al. ............. 705/4 |
| 2004/0243588 | A1 | 12/2004 | Tanner et al. |
| 2005/0027633 | A1* | 2/2005 | Fortuna et al. ............. 705/36 |
| 2005/0055275 | A1* | 3/2005 | Newman et al. ............ 705/14 |
| 2005/0154769 | A1* | 7/2005 | Eckart et al. ............... 707/201 |
| 2006/0184410 | A1* | 8/2006 | Ramamurthy et al. ...... 705/8 |
| 2006/0229799 | A1* | 10/2006 | Nimmo et al. ............. 701/117 |
| 2007/0156718 | A1 | 7/2007 | Hossfeld et al. |

FOREIGN PATENT DOCUMENTS

| | | |
|---|---|---|
| WO | WO 2004-114160 | 12/2004 |
| WO | WO 2005-022348 | 10/2005 |

OTHER PUBLICATIONS

Nik Bienkowski, A new tool for portfolio risk management—gold bullion, Apr. 2003. (Bienkowski).*

Press Release, "Experian launches comprehensive Portfolio Solution to track, analyze and benchmark credit marketplace activity and trends." Experian Global Press Office, Oct. 19, 2005.

Institute for Market Transformation, Recognition and Use by Appraisers of Energy-Performance Benchmarking Tools for Commercial Buildings, Feb. 2003 (BMark).

Paolo Giudici, Applied Stochastic Models in Business and Industry, Bayesian data Mining with application to benchmarking and credit scoring, Sep. 1999, vol. 17 Issue, pp. 68-81 (Bayesian).

* cited by examiner experian

Portfolio Benchmarking and Trend Analysis

| BUILD / EDIT QUERY | QUERY MANAGEMENT DASHBOARD | USAGE REPORTS |

LOGOUT...

FAQ | Contact us

Help me with this page >>

Query builder menu

―― Define population ――
Time type: Month —108
Time slice: 01/03–12/03 —110
View: Portfolio —112
Account type: HE Loan, Mortgage —114
Account condition: Open —116
Account distinction: All —118
Peer group: National banks —120

―― Segment population (optional) ――
Geography type: MSA —122
Geography area(s): CA–Los Angeles, CA–San Francisco, CA–San Diego, FL–Miami, Fl–Orlando, FL–Tampa, TX–Dallas, TX–Houston, TX–San Antonio —124
Score classification*: 680+ —126
*May be used in segment population step or Select attributes step.

―― Select attributes ――
Select attributes: Maturing in 1 year, Amount range (HE Loan)–$6,000+, Amount range (Mortgage)–$180K+

Build a new query

View demo >>
User group (PDF) >>

Step 1: Define the population
Define time period, market or portfolio view, account type, condition and distraction.

Step 2: Segment the population (optional)
Define geography and score classification.

Step 3: Select attributes

User's first saved query

☐ Benchmark my portfolio

Get started >>

Edit an existing query

View all queries >>

Select a radio button to review query
○ User's first saved query
○ User's second saved query
○ User's third saved query Edit >>

FIG. 1

| Service Level 1 Simple Query | | Output result in database format |
|---|---|---|
| Type of Report | Trend | % of Open Bankcard trades for Super Prime risk group in CA with a 30+ delinquency |
| View | Portfolio | |
| Time | Quarter | |
| Selected Time Slice(s) | 1Q 2002, 1Q 2003, 1Q 2004 | |
| Account Type Category | Bankcard | |
| Account Condition | Open | |
| Account Distinction | All | |
| Geography Type | State | |
| Geographical Area(s) | CA | |
| Score Classification | Super Prime | |
| Trade Attribute Value | 30+ DPD | |

| 30+DPD Delinquency | | | |
|---|---|---|---|
| | 1Q 2002 | 1Q 2003 | 1Q 2004 |
| CA | 45.87% | 39.75% | 49.58% |

Output result in Chart format:

CSV file:

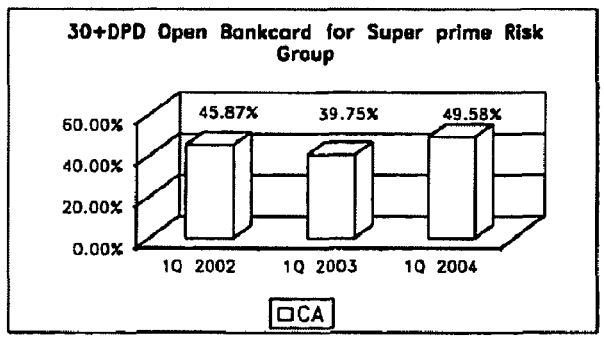

FIG. 2

| Service Level 1 Complex Query | | Output result in database format | | | | | |
|---|---|---|---|---|---|---|---|
| Type of Report | Trend | % of Open Bankcard trades for Super Prime risk group in selected states with a 30+ delinquency | | | | | |
| View | Portfolio | | | | | | |
| Time | Month | | | | | | |
| Selected Time Slice(s) | 1/04, 2/04, 3/04, 4/04, 5/04, 6/04 | 30+DPD Delinquency | | | | | |
| Account Type Category | Bankcard | | 01/04 | 02/04 | 03/04 | 04/04 | 05/04 | 06/04 |
| Account Condition | Open | CA | 12.54% | 13.62% | 15.83% | 14.71% | 15.04% | 15.87% |
| Account Distinction | All | TX | 10.98% | 11.92% | 13.86% | 12.88% | 13.17% | 13.89% |
| Geography Type | State | FL | 16.00% | 17.37% | 20.19% | 18.76% | 19.18% | 20.24% |
| Geographical Area(s) | CA, TX, FL, NV, UT, AZ, WA, OR, CO | NV | 15.06% | 16.36% | 19.01% | 17.67% | 18.06% | 19.06% |
| Score Classification | Super Prime | UT | 17.24% | 18.72% | 21.76% | 20.22% | 20.67% | 21.82% |
| Trade Attribute Value | 30+ DPD | AZ | 16.23% | 17.63% | 20.49% | 19.04% | 19.47% | 20.54% |
| Output result in Chart format: | | WA | 16.14% | 17.53% | 20.38% | 18.94% | 19.36% | 20.43% |
| | | OR | 18.43% | 20.01% | 23.26% | 21.61% | 22.10% | 23.32% |
| CSV file: | | CO | 16.38% | 17.79% | 20.67% | 19.21% | 19.64% | 20.72% |

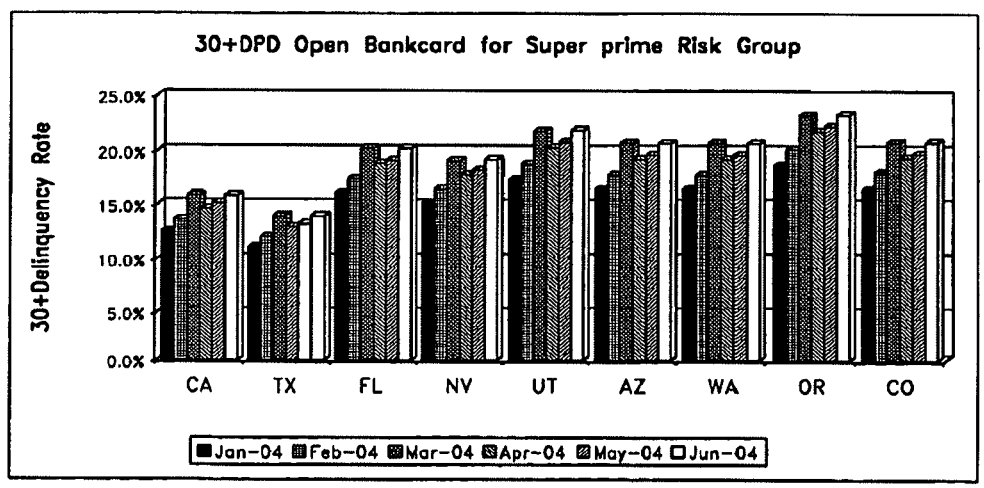

FIG. 3

| Service Level 2 Simple Query | | Output result in database format |
|---|---|---|
| Type of Report | Trend | % of Consumers with open Mortgages trades at National Banks for the Prime risk group maturing 1 year |
| View | Consumer | |
| Time | Quarter | |
| Selected Time Slice(s) | 1Q 04, 2Q 04, 3Q 04, 4Q 04 | |
| Account Type Category | Mortgage | |
| Account Condition | Open | |
| Account Distinction | All | |
| Peer Group | National Banks | |
| Geography Type | Region | |
| Geographical Area(s) | Northeast | |
| Score Classification | Prime | |
| Trade Attribute Value | Maturing in 1 Year | |

Maturing in 1 Year

| | 1Q 04 | 2Q 04 | 3Q 04 | 4Q 04 |
|---|---|---|---|---|
| NE | 6.78% | 7.13% | 6.98% | 8.54% |

Top Ten Peers in Query:
- Bank One
- Bank of America
- USAA
- Washington Mutual
- PNC
- Chase
- Wachovia
- 5th 3rd Bank
- Wells Fargo
- First Premier Output result in Chart format:

CSV file:

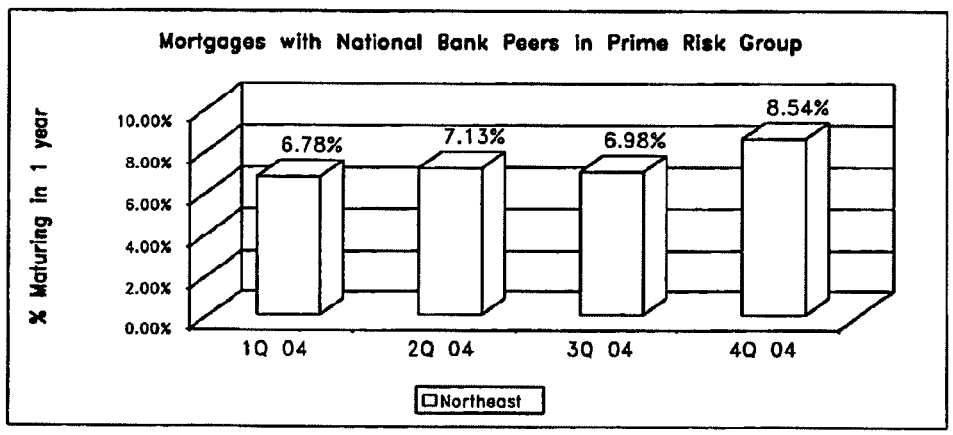

FIG. 4

| Service Level 2 Complex Query | | Output result in database format | | | | | |
|---|---|---|---|---|---|---|---|
| Type of Report | Trend | % of Consumers with open Mortgages trades at National Banks for the Prime risk group maturing 1 year | | | | | |
| View | Consumer | | | | | | |
| Time | Quarter | | | | | | |
| Selected Time Slice(s) | 1Q 03, 2Q 03, 3Q 03, 4Q 03, 1Q 04, 2Q 04 | Maturing in 1 Year | | | | | |
| | | | 1Q 03 | 2Q 03 | 3Q 03 | 4Q 03 | 1Q 04 | 2Q 04 |
| Account Type Category | Mortgage | NE | 12.54% | 13.62% | 15.83% | 14.71% | 15.04% | 15.87% |
| Account Condition | Open | W | 10.98% | 11.92% | 13.86% | 12.88% | 13.17% | 13.89% |
| Account Distinction | All | MW | 10.98% | 11.92% | 13.86% | 12.88% | 13.17% | 13.89% |
| Peer Group | National Banks | S | 16.00% | 17.37% | 20.19% | 18.76% | 19.18% | 20.24% |
| Geography Type | Region | Top Ten Peers in Query: | · Bank One | | · Chase | | | |
| Geographical Area(s) | NE, W, MW, S | | · Bank of America | | · Wachovia | | | |
| Score Classification | Prime | | | | · 5th 3rd Bank | | | |
| Trade Attribute Value | Maturing in 1 Year | | · USAA | | · Wells Fargo | | | |
| Output result in Chart format: | | | · Washington Mutual | | · First Premier | | | |
| CSV file: | | | · PNC | | | | | |

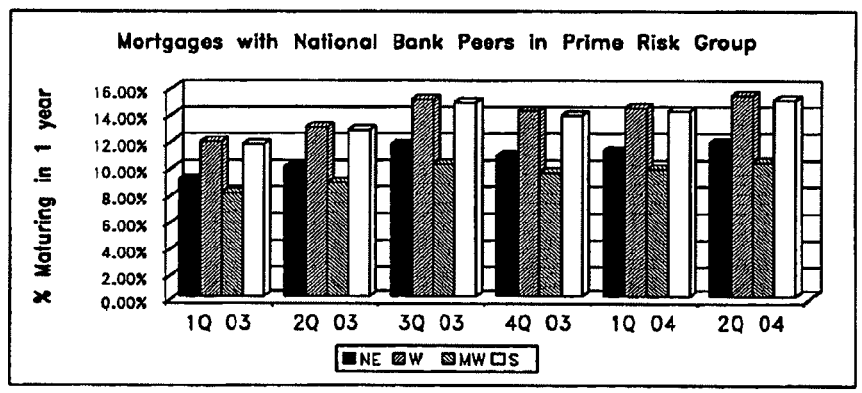

*FIG. 5*

| Service Level 3 Simple Query | | Output result in database format | | | |
|---|---|---|---|---|---|
| Type of Report | Trend | % of Open HELOC trades at National Banks for the Prime risk group with BTL 26-50% | | | |
| View | Portfolio | | | | |
| Time | Month | National Banks | | | |
| Selected Time Slice(s) | 01/04, 02/04, 03/04 | BTL 26-50% | | | |
| Account Type Category | HELOC | | 01/04 | 02/04 | 03/04 |
| Account Condition | Open | Los Angeles | 27.02% | 29.35% | 34.11% |
| Account Distinction | New | San Francisco | 23.66% | 25.69% | 29.87% |
| Peer Group | National Banks | Atlanta | 23.66% | 25.69% | 29.87% |
| Geography Type | MSA | Dallas | 34.48% | 37.43% | 43.51% |
| Geographical Area(s) | LA, SF, AT, DA | My Portfolio (HELOC) | | | |
| Score Classification | Prime | BTL 26-50% | | | |
| Trade Attribute Value | BTL 26-50% | | 01/04 | 02/04 | 03/04 |
| | | Los Angeles | 33.66% | 36.56% | 42.50% |
| | | San Francisco | 29.48% | 32.00% | 37.21% |
| CSV file: | | Atlanta | 29.48% | 32.00% | 37.21% |
| Output result in Chart format: | | Dallas | 42.95% | 46.63% | 54.20% |

| Top Ten Peers in Query | · Wells Fargo | · Chase | · USAA |
|---|---|---|---|
| | · MBNA | · Washington Mutual | · Citizens Bank |
| | · Southtrust | · Wachovia | · Bank of America |
| | | | · Citi Bank |

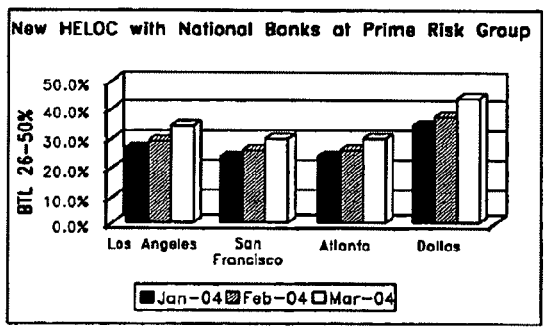

New HELOC with National Banks at Prime Risk Group

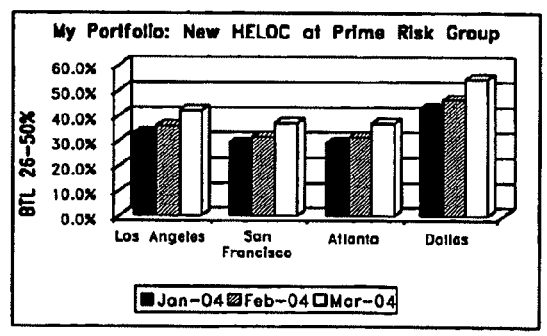

My Portfolio: New HELOC at Prime Risk Group

FIG. 6

| Service Level 3 Simple Query | | Output result in database format | | | | | | |
|---|---|---|---|---|---|---|---|---|
| Type of Report | Trend | % of Open HELOC trades at National Banks for the Prime risk group with BTL 26-50% | | | | | | |
| View | Portfolio | | | | | | | |
| Time | Month | National Banks | | | | | | |
| Selected Time Slice(s) | 01/04, 02/04, 03/04 04/04, 05/04, 06/04 | BTL 26-50% | | | | | | |
| Account Type Category | HELOC | | 01/04 | 02/04 | 03/04 | 04/04 | 05/04 | 06/04 |
| Account Condition | Open | Los Angeles | 33.88% | 34.87% | 23.32% | 36.54% | 35.31% | 34.79% |
| Account Distinction | New | San Francisco | 25.15% | 24.35% | 17.17% | 24.88% | 29.33% | 27.56% |
| Peer Group | National Banks | Atlanta | 27.58% | 26.12% | 20.41% | 32.75% | 36.35% | 29.02% |
| Geography Type | MSA | Dallas | 35.14% | 36.64% | 23.32% | 34.79% | 39.16% | 37.42% |
| Geographical Area(s) | LA, SF, AT, DA, HO MIA, AU | Houston | 28.64% | 27.61% | 17.85% | 27.59% | 28.99% | 36.62% |
| | | Miami | 29.28% | 30.16% | 18.80% | 30.16% | 31.03% | 33.88% |
| Score Classification | Prime | Austin | 44.65% | 42.63% | 53.86% | 43.62% | 45.01% | 43.89% |
| Trade Attribute Value | BTL 26-50% | My Portfolio (HELOC) | | | | | | |
| | | BTL 26-50% | | | | | | |
| | | | 01/04 | 02/04 | 03/04 | 04/04 | 05/04 | 06/04 |
| | | Los Angeles | 38.75% | 39.87% | 26.66% | 41.78% | 40.36% | 39.78% |
| | | San Francisco | 28.75% | 27.84% | 19.64% | 28.45% | 33.54% | 31.52% |
| | | Atlanta | 31.54% | 29.87% | 23.34% | 37.45% | 41.57% | 33.19% |
| | | Dallas | 40.18% | 41.90% | 26.66% | 39.78% | 44.78% | 42.79% |
| | | Houston | 32.75% | 31.58% | 20.41% | 31.55% | 33.15% | 41.88% |
| CSV file: | | Miami | 34.49% | 21.49% | 34.49% | 35.49% | 38.74% | 33.49% |
| Output result in Chart format: | | Austin | 51.05% | 48.75% | 61.58% | 49.88% | 51.47% | 50.19% |

| Top Ten Peers in Query | · Wells Fargo | · Chase | · USAA |
|---|---|---|---|
| | · MBNA | · Washington Mutual | · Citizens Bank |
| | · Southtrust | · Wachovia | · Bank of America |
| | | | · Citi Bank |

*FIG. 7A*

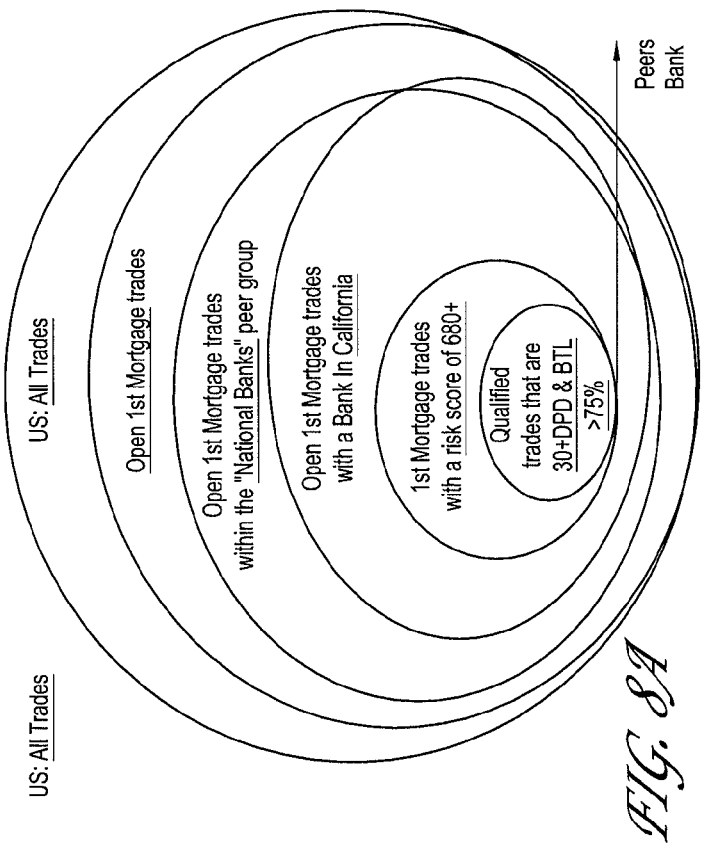

| | Cons | Score | Zip | State | BK | Inq: BAC | Inq: AUT | Acct | Cond | Dist | Amt | Bal | Del: | BTL | Subcode | Peer |
|---|---|---|---|---|---|---|---|---|---|---|---|---|---|---|---|---|
| 1 | 123 | 720 | 92626 | CA | No | No | Yes | BAC | Open | New | 5,000 | 3,000 | 30 | 60% | 78459 | NatBk |
| 2 | 123 | 720 | 92626 | CA | No | No | Yes | AUT | Closed | All | 15,000 | 1,000 | 60 | 6.7% | 98457 | RegBk |
| 3 | 123 | 720 | 92626 | CA | No | No | Yes | BAC | Closed | All | 10,000 | 0 | Cur | 0% | 98457 | RegBk |
| 4 | 456 | 650 | 90814 | CA | Yes | Yes | No | Mrtg | Open | New | 95,000 | 94,000 | Cur | 99% | 12487 | Mortg |
| 5 | 456 | 650 | 78041 | TX | Yes | Yes | No | BAC | Open | New | 2,000 | 1,500 | Cur | 75% | 78459 | NatBk |

FIG. 10

CREDIT PORTFOLIO BENCHMARKING SYSTEM AND METHOD

CROSS-REFERENCE TO RELATED APPLICATIONS

This application is a continuation of U.S. application Ser. No. 11/475,428, filed Jun. 26, 2006, now U.S. Pat. No. 7,676,418, which claims the benefit of U.S. Provisional Application No. 60/693,757, filed Jun. 24, 2005 and entitled CREDIT PORTFOLIO BENCHMARKING SYSTEM AND METHOD, all of the disclosures of which, including all appendices attached to the provisional application, are hereby incorporated by reference in their entirety into this application.

BACKGROUND OF THE INVENTION

1. Field of the Invention

Embodiments of the systems and methods described herein relate to providing benchmarking information regarding credit portfolios.

2. Description of the Related Art

Lending institutions provide credit accounts such as mortgages, automobile loans, credit card accounts, and the like, to consumers. In the credit industry, each credit account is known as a "trade." Each consumer of credit may have one or multiple trades associated with him or her. For example, it is common for consumers to be associated with multiple trades at least because many consumers have multiple credit card accounts. In addition, many consumers have one or more mortgages, student loans, automobile loans, and other credit accounts.

Each lending institution focuses its credit offerings on particular geographical areas, account types, and market segments. Several national lending institutions exist that offer many account types to many market segments. Such national lending institutions include large national banks with branches in many cities that offer a wide variety of loans, including, for example, commercial loans, mortgages, home equity loans and lines of credit, and the like. Other lending institutions have a regional or local focus. Additionally, many lending institutions focus on particular account types. For example, some institutions primarily offer credit card accounts, while others offer primarily automobile loans, and the like. Additionally, many lending institutions focus on particular market segments, such as, for example, consumers with prime credit, consumers with subprime credit, and the like.

Accordingly, each lending institution offers its own unique mix of trades. Such a unique mix of trades can be known as a portfolio. Lending institutions typically desire to compare their portfolio with other portfolios in the industry. Lending institutions particularly desire to compare their portfolio with portfolios offered by their peer group, or other lending institutions that compete most directly with the lending institution. Conventional automated tools for assisting with such portfolio comparison or benchmarking, however, have been inadequate.

SUMMARY

Embodiments of the systems and methods described herein include tools for querying massive amounts of current and historical trade data and for generating benchmarking reports about trades that match user-defined criteria. Advantageously, in one preferred embodiment, the system stores current and historical data for a large percentage of trades tracked by credit bureaus or other credit reporting organizations. Advantageously, current trade data can comprise data about the status of trades as of a recent date, such as, for example, trade status information from within one month of the date on which a query is performed. In other embodiments, current trade data can comprise trade status information from within one week, two weeks, six weeks, two months, or the like. Historical trade data can comprise data about the status of trades as of a historical date, such as, for example, a date in a previous month, quarter, or year.

In one embodiment, a credit portfolio benchmarking system comprises a repository of trade data, a repository of consumer data, a build computer, and a benchmarking query application. The repository of trade data comprises a plurality of data items regarding trade lines. The repository of consumer data comprises a plurality of data items regarding consumers, wherein at least some information in the consumer data is not in the trade data and at least some information in the trade data is not in the consumer data. The build computer periodically generates at least one data file comprising a plurality of data items, each data item combining information from the trade data and the consumer data, such that searches can be performed on the combined data without joining trade data and consumer data at query run time. The benchmarking query application executes queries on the data file generated by the build computer.

Many variations of the foregoing embodiment exist. For example, the benchmarking query application may execute queries on the data file generated by the build computer in order to generate a report that shows a lending institution benchmarking information about at least one credit portfolio. The benchmarking application may execute queries that take into account at least a population definition. The benchmarking application may execute queries that also take into account at least an attribute selection. The benchmarking application may execute queries that also take into account at least a population segmentation. The benchmarking application may comprise a user input component that receives user-entered parameter values related to the population definition, the attribute selection, and the population segmentation. The user input component of the benchmarking application may comprise an active query build portion comprising a portion of a display screen that remains visible during user entry of a query. Such an active query build portion may further comprise hypertext links associated with parameter values that have been entered, wherein a user may invoke one of the hypertext links in order to edit an entered parameter value.

The foregoing and other embodiments may perform various methods of providing credit portfolio benchmarking reports. For example, one such method includes the operations of (1) generating a data file that comprises information combined from trade data and consumer data, the trade data including at least some data not included in the consumer data and the consumer data including at least some data not included in the trade data, (2) populating a benchmarking database that comprises at least part of the data file combined from the trade data and the consumer data, (3) running a query on the benchmarking database, wherein the query does not require a query run time join of the trade data and the consumer data, and (4) providing a credit portfolio benchmarking report generated at least in part from results of the query.

The above method may include various optional operations. For example, in one embodiment, the method also includes the operation of receiving a user selection of a portfolio benchmarking report service level, wherein the providing a credit portfolio benchmarking report provides differing levels of information depending on the selected service level. Providing a credit portfolio benchmarking report may comprise providing a report that includes a list of top peers competing for accounts of a particular type. Such a list of top peers may include a minimum number of peers to make it difficult to determine portfolio characteristics regarding a specific peer from the credit portfolio benchmarking report. Advantageously, including a minimum number of peers in this way allows a lending institution to find out basic information about the industry peer group without having confidential information of a specific peer revealed.

The foregoing, methods may also include an operation of storing a current month data file and a plurality of archive data files for data from different time periods, such that queries can be run on different time periods in order to determine trends related to credit portfolio benchmarking. In one embodiment, at least 24 monthly archive data files are stored. A skilled artisan will appreciate, in light of this disclosure, that fewer than 24 or more than 24 monthly archive data files may be stored. For example, at least 36, at least 30, at least 20, at least 16, at least 12, or at least 8 monthly archive data files may be stored.

In one embodiment, the operation of generating a data file comprises taking a statistical sample of at least 20% of total available data items in the trade data and the consumer data. A skilled artisan will appreciate, in light of this disclosure, that a statistical sample of a different size may be taken. For example, the statistical sample may comprise at least 18%, at least 16%, at least 14%, at least 12%, at least 10%, or at least 8% of total available data items.

In one embodiment, computer executable code is recorded in a computer readable medium, and the computer executable code is configured to cause a general purpose computer to: (1) receive user input regarding query parameters for querying a credit portfolio benchmarking database comprising trade data and consumer data and generating a query report, the parameters relating to defining a query population, segmenting the population, and selecting attributes, (2) query the credit portfolio benchmarking database, and (3) generate a credit portfolio benchmarking report based on results of the query operation, wherein the credit portfolio benchmarking report is derived at least in part from both trade data and consumer data but the query operation does not require a query run time join of trade data and consumer data.

The foregoing computer executable code can be varied in numerous ways. For example, in one embodiment, the user input received regarding query parameters includes at least a parameter for specifying a time period for the credit portfolio benchmarking report. In another embodiment, the user input received regarding query parameters further includes at least a parameter for specifying one or more account types. In another alternative, the user input received regarding query parameters further includes at least a parameter for specifying a peer group. In yet another embodiment, the user input received regarding query parameters further includes at least a parameter for specifying one or more geographical areas.

These and other embodiments of the systems and methods described herein advantageously generate benchmarking and peer group reports that allow lending institutions to analyze the types of credit accounts and products being offered by themselves and their peers. The foregoing embodiments are provided by way of illustration only and the invention is not limited to these embodiments. Likewise, the invention is not limited to the other embodiments described below in the following detailed description of preferred embodiments. Indeed, a skilled artisan will understand, in light of this disclosure, how to implement variations and other embodiments that are not explicitly described herein but are apparent to a skilled artisan in view of the examples set forth herein. For example, while various software modules are described herein, a skilled artisan will understand, in light of this disclosure, that some modules may be omitted or combined while still achieving the advantageous features set forth herein. Additionally, a skilled artisan will understand, in light of this disclosure, that features may be omitted from embodiments and that such embodiments may still be novel and non-obvious when compared to the prior art.

Accordingly, neither this summary section nor the detailed description of preferred embodiments purports to define the invention.

BRIEF DESCRIPTION OF THE DRAWINGS

FIG. 1 is a screen shot that illustrates a query generation screen according to one embodiment.

FIG. 2 illustrates generated query results for a query.

FIG. 3 illustrates generated query results for a query.

FIG. 4. illustrates generated query results for a query.

FIG. 5 illustrates generated query results for a query.

FIG. 6 illustrates generated query results for a query.

FIGS. 7A and 7B illustrate generated query results.

FIGS. 8A and 8B illustrate a build example.

FIG. 10 is a table that illustrates a number of records.

DETAILED DESCRIPTION OF PREFERRED EMBODIMENTS

Figure 7B:
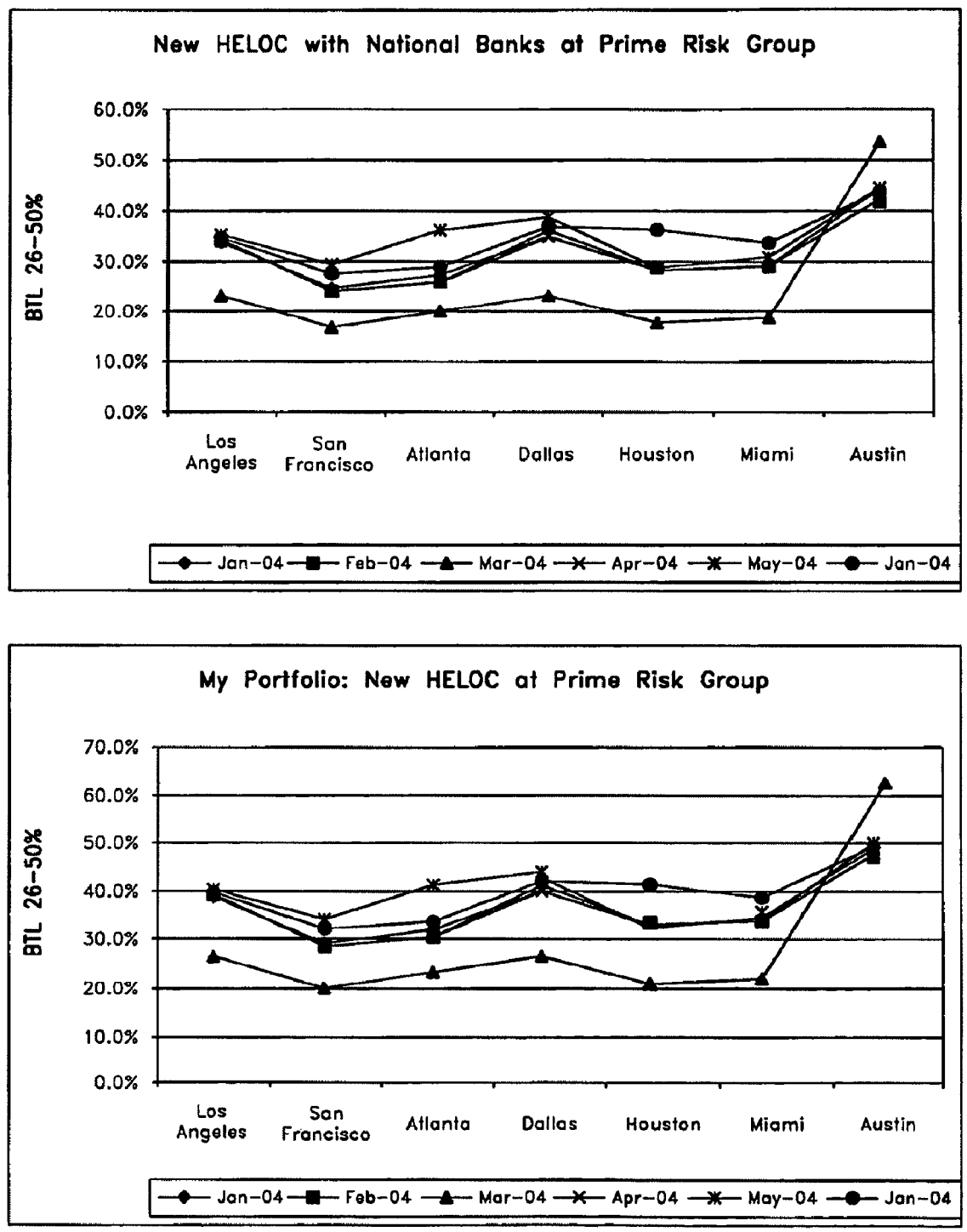

Embodiments of the systems and methods described herein include tools for querying massive amounts of current and historical trade data and for generating benchmarking reports about trades that match user-defined criteria. Advantageously, in one preferred embodiment, the system stores current and historical data for a large percentage of trades tracked by credit bureaus or other credit reporting organizations. Advantageously, current trade data can comprise data about the status of trades as of a recent date, such as, for example, trade status information from within one month of the date on which a query is performed. In other embodiments, current trade data can comprise trade status information from within one week, two weeks, six weeks, two months, or the like. Historical trade data can comprise data about the status of trades as of a historical date, such as, for example, a date in a previous month, quarter, or year.

This section describes various embodiments and architectures for a portfolio benchmarking system capable of performing the above and other features and methods. This section illustrates these embodiments with reference to a number of drawings. A skilled artisan will appreciate, however, in light of this disclosure, that the description of preferred embodiments does not limit the invention to those embodiments only. For example, while the embodiments described herein are implemented as one or more software modules to be executed on one or more computers, a skilled artisan will appreciate, in light of this disclosure that the described software modules could also be implemented as any combination of software, hardware, and firmware. Furthermore, a skilled artisan will appreciate that much flexibility exists for software and hardware implementations. For example, a calculation or function described herein can be performed by one software module or a related group of software modules. Similarly, a calculation or function described herein can be performed by a single hardware device comprising logic gates and other circuitry or can be performed by more than one related hardware devices.

Accordingly, by way of illustration and not limitation, this section now describes certain preferred embodiments with reference to the drawings. FIG. 1 is a screen shot that illustrates a query generation screen according to one embodiment. As illustrated, one embodiment of a query generation screen 100 comprises a population definition portion 102, a population segmentation portion 104, and an attribute selection portion 106. Accordingly, a user can define a query by defining a population of data to be queried, optionally segmenting the population, and selecting attributes.

The population definition portion 102 comprises a plurality of data fields that allow the user to define the population by indicating one or more parameters such as, for example, a time type 108, a time slice 110, a view 112, account types 114, account conditions 116, account distinctions 118, peer group 120, and the like.

In one embodiment, the time type 108 indicates the time period for the data archives that are to be queried. In one embodiment, the system includes 24 monthly archives that record monthly data for the last 2 years, 20 quarterly archives that record quarterly data for the last 5 years, and 10 yearly archives that record yearly data for the last 10 years. By specifying the time type 108, the user can specify which of these archives are to be queried.

The time slice 110 parameter allows the user to define a range of dates that the query is to cover. For example, in the example illustrated, the user has selected a time slice from January 2003 to December 2003. Accordingly, when the query is executed, the system executes the query on each monthly archive from January 2003 to December 2003, and displays the results of such queries on a month-to-month basis. Alternatively or additionally, the results can include aggregate results over the chosen time period, such as, for example, mean monthly results, median monthly results, and the like. A skilled artisan will appreciate, in light of this disclosure, that any known statistical function, such as, for example, mean, median, mode, standard deviation, and the like, can be used to generate aggregate results over a time period.

The view 112 parameter, in one embodiment, allows the user to select whether to view a "portfolio" view or a "market" view. A portfolio view treats each trade separately, including trades associated with a single consumer. Accordingly, a portfolio view can be used to determine the number or percentage of individual trades meet the criteria specified by the user. A market view, on the other hand, focuses on unique consumers, not unique trades. Thus, a market view can be used to determine the number or percentage of consumers that are associated with at least one trade that meets the criteria specified by the user.

The account type 114 parameter, in one embodiment, allows the user to limit the population of data to be queried to trades representing a particular account type. The account types can include, for example, home equity loans, home equity lines of credit, mortgages, student loans, credit card accounts, automobile loans, and the like. Similarly, the account condition parameter allows the user to limit the population of data to be queried to trades of a particular condition, such as, for example, open accounts, closed accounts, and the like. The account distinction parameter allows the user to further limit the population according to age of trade.

The peer group 120 parameter allows the user to limit the population of data to be queried to the trades reported by financial institutions of a particular peer group. Each peer group defines, generally, a classification of financial institutions that compete with each other for the same trades in the same geographical area. National banks, for example, are large banks with branches throughout the United States that compete for most consumer-oriented trades, such as mortgages, home equity lines of credit, credit card accounts, and the like. Other peer groups include regional banks, credit unions, and the like. In one embodiment, defining the population by peer group is an optional service offered to customers who have opted to receive this level of service. Viewing results by peer group may be offered as a premium service at a subscription fee that is higher than the fee required for standard service that does not include the peer group feature. A skilled artisan will appreciate, in light of this disclosure, that any of the other parameters, in addition to the peer group parameter, can be made available on an optional basis, with or without requiring a premium.

In another optional service provided by some embodiments of the system, not illustrated by FIG. 1, the service allows the user to compare the queried population of trades with trades in the client's portfolio that meet the query's criteria. That is, in these embodiments, the system determines which trades correspond to the client and treats those trades as a subpopulation. The system runs the defined query on the client portfolio subpopulation in order to determine what percentage of the client's portfolio meets the criteria. The system also runs the query on the general population such that the client can compare the general industry portfolio with the client's own portfolio. Advantageously, this option allows the client to focus directly on the client's market segment. The client can then generate benchmarking reports that allow the client to understand the state of the market that the client competes in and trends that have occurred or are occurring in that market. As with viewing results by peer group, this optional service is, in one embodiment, a premium service that may be subject to an additional fee.

In one embodiment, the system provides query and reporting features based on a tiered service level approach. For example, the system provides access to aggregate reports that do not include peer group information in a first service level, or service level one. The system provides access to reports that do include peer group information in a second service level, or service level two. The system provides access to reports that include peer group information and to reports that focus precisely on the client's own portfolio in a third service level, or service level three.

As illustrated, the system optionally allows the user to segment, or subdivide, the population to be queried. In one embodiment, the population segmentation portion 104 allows the user to segment the population according to geographic areas defined by geography types and the population can also be segmented by score classification. The geography type 122 field allows a user to specify a geography type. Each geography type can provide a way to classify the geographic area of a trade, generally by where the consumer associated with the trade lives. Illustrative but not exclusive geography types include, for example, Metropolitan Statistical Area ("MSA"), ZIP code, city, state, county, and the like. Upon selecting a geography type, the user is able, in embodiments of the system, to select specific geographical areas 124 that conform to the selected geography type. For example, as illustrated, when the user has selected the MSA geography type, the user can select MSAs such as, for example, CA-Los Angeles, Calif.-San Francisco, and the like.

The score classification 126 field allows the user to segment the population by one or more credit score classifications. For example, as illustrated, the system allows a user to select a credit score, such as 680, and to include within the population all trades associated with consumers that have a credit score of at least 680. The credit score can be any numerical, alphabetic, or other score used to designate the creditworthiness of a consumer. Principles of credit scoring are known to a skilled artisan, and any credit score can be devised to work with the systems and methods of this disclosure. No particular credit scoring formula is required.

In one embodiment, population segmentation allows the user to specify different population segments that the system uses to run multiple queries. Essentially, the system runs one query for each population segment such that, for each query, the particular population segment being queried is treated as a separate population. In one embodiment, the user is able to view results that are broken down by population segment, such that, for example, a user can view a percentage of Los Angeles trades that meet specified, criteria, a percentage of San Francisco trades that meet the same criteria, and the like. Alternatively or additionally, the system can be configured to calculate and display aggregate information about all trades that fall into any one of the population segments.

In one embodiment, the user also selects trade attributes as part of the query, using the attribute selection portion 106. In an advantageous embodiment, the system is configured to find the number, percentage, or both, of trades within the defined population or population segment, that meets the selected attributes. Example attributes include bankruptcy attribute values that are set for a trade if the consumer associated with the trade has been bankrupt within the last month, quarter, or year, inquiry attribute values that are set for a trade if a certain number of credit inquiries have occurred for the consumer associated with the trade within a defined period of time, delinquency attribute values that are set if a trade is more than 30 days past due, more than 60 days past due, or the like, balance amount attribute values based on the balance outstanding on the trade, loan amount attribute values based on the total loan amount of the trade, balance to loan attribute values based on a balance to loan amount ratio, and months-to-maturity attribute values.

In one embodiment, the user may build and run a query using an application of the portfolio benchmarking system. FIG. 1 illustrates one embodiment of a query generation screen 100 of an application that guides the user through building a query. The query generation screen 100 in FIG. 1 illustrates the first of multiple screens that are used to build the query in one embodiment.

After the user decides to begin building the query, the user selects the Get Started button and is then taken to a second screen where the user may, for example, define the Time Period by Time Type and Time Slice. The user may then select a Continue button and is taken to a third screen where the user enters, for example, the type of View the user wants to use and selects a Continue button. The user may then be taken to a fourth screen where the user enters, for example, the Account Type, the Account Condition, and the Account Distinction. The user continues to traverse the screens until the user enters all of the information the application needs to run the query. When the user is finished, the user can then select a Run Query button. The user is then presented with a set of results. FIGS. 2-7B illustrate examples of results that can be generated by the system in response to example queries and are discussed below in more detail.

There are some occasions, however, when the user may want to change some of the data that he or she previously entered. In other systems, the user has to use the back navigation keys or buttons to return to the desired screen and then use the forward navigation keys or buttons to return to where the user left off. This linear navigation is often impractical for applications with multiple screens. Other systems may include page tabs that merely allow the user to jump from one part of the application to another. The tabs, however, do not allow the user to view his or her previous data selections.

In one embodiment, the screens include a query builder menu or active query portion 130 that allows the user to view the parameter label along with the data selected by the user and to use the query build menu 130 to navigate through the screens of the application. As the user submits the information to the application, the application presents the next screen to the user and presents some, all, a summary, and/or a representation of the submitted information in the query builder menu 130. This menu 130 allows the user to see the information that he or she has already selected. Additionally, the query build menu 130 may be configured to allow the user to edit a previously-entered value. By remaining visible on multiple screens, the query builder menu 130 allows the user to easily keep track of the entire query, including, for example, the population definition, the population segmentation, and the attribute selection, as the query is being built.

In such embodiments, when a value for a parameter has been entered, the value is displayed alongside the appropriate parameter label in the active query portion 130. Additionally, the associated parameter label, the parameter value, both, or a portion of either or both, is converted into a hyperlink. In other embodiments, the hyperlink is available even if a value for a parameter has not been entered. When the user selects one of the hyperlinks in the active query portion 130 that is associated with a parameter, the application presents the user with the screen that includes the information associated with the parameter. The user is then the allowed to edit the values for that parameter. Such editing may occur, for example, by prompting the user to enter information in the query build portion 128. This navigation feature allows the user to move quickly through the application and be able to return to areas in the application where modifications should be made.

For example, if the user is at the fifth screen and wants to change the Time Slice to include another month, the user selects the hyperlink that corresponds to the Time Slice parameter in the query builder menu 130 and the application presents the second screen to the user and allows the user to update the value for Time Slice. The second screen also includes the query builder menu 130 that lists the selections the user has made thus far. The user may then select a button that will return the user to where he or she left off, which in this example is screen five.

As an alternative example, after updating the Time Slice, the user may then want to also update the Account Condition and selects the hyperlink that corresponds to the Account Condition parameter in the query builder menu 130. The system presents the fourth screen to the user which includes the query builder menu 130 with the user's data selections including the updated Time Slice as well as a button that allows the user to return to where he or she left off.

In one embodiment, after receiving updated data from the user, the system may present the user with screens that include data that should be updated by the user. After the application receives the updated data from the user, the application determines whether the updated data affects any data previously selected by the user. For example, if the user first sets the State as California and the Home Area Code as 949 and then goes and changes the state to New York, the application presents the screen to the user with the Home Area Code parameter allowing the user to update the value for Home Area Code since 949 is not a proper value for a New York Home Area Code.

In the embodiment shown in FIG. 1, the hyperlink that corresponds to the information is a hyperlink that is associated with the parameter label, though it is recognized that a variety of user interface features may be used and that links may be used with other items in the menu, such as, for example, the data value submitted by the user. Moreover, while FIG. 1 illustrates buttons, radio buttons, hyperlinks, and other user interface features, it is recognized that a variety of other user interface features may be used in the application.

In addition, while the embodiment above contemplates multiple screens, it is recognized that in other embodiments, the application may include a single screen that utilizes a window that presents multiple screens in the window. For example, the presentation of different data to the user in the query build portion 128 may represent the multiple screens. In such an embodiment, the user may build a query parameter-by-parameter using a query build portion 128. Thus, as each parameter is presented to the user in the query build portion 128, the user enters or selects one or more values for the parameter. When the user completes parameter entry for one parameter, another parameter is presented to the user in the query build portion 128. In addition, the active query portion 130 comprises a portion of the screen that remains visible during the process of entering parameters.

FIG. 1 illustrates one embodiment of the navigation feature as utilized in a web application for a portfolio benchmarking system. In the portfolio benchmarking system, the web application allows the user to define a population, segment a population, and select attributes using different data fields or parameters. The user is selecting the information and the user may utilize the active query menu to return to screens or pages where he or she wants to make a modification. It is recognized, that the navigation feature may be utilized in a variety of different applications.

Moreover, while the embodiments discussed above relate to a web-based application, it is recognized that the query builder menu 130 may be used in a variety of applications including, stand alone applications that run on a variety of devices.

In a preferred embodiment, each of the foregoing attributes, and any other attributes known to a skilled artisan, are independently coded by the system using a classification and codification system. Advantageously, this independent classification and codification allows the system to finely distinguish between trades using any one of the attributes or any combination of multiple attributes. For example, the system can generate a report of the percentage of trades maturing in 1 year where the amount ranges from $6,000 to $24,000. As another example, the system can generate a report of the percentage of trades maturing in 6 months where the amount ranges from $75,000 to $125,000. The ability to generate either of these reports provides an example where a single distinction, the months-to-maturity, is used to provide a good, accurate, and precise understanding of the market. Advantageously, therefore, providing for a large number of precisely defined attributes allows the user to generate reports from which can be obtained a precise understanding of the market.

Below is a table showing, in one embodiment, user selection options for the above steps of defining the population, segmenting the population, and selecting attributes:

| Query Selection Options | Query Selection Values |
| --- | --- |
| Time Category | "M" = Month |
| | "Q" = Quarter |
| | "Y" = Year |
| Number of Time Slices | 1 to 24 for Month |
| | 1 to 20 for Quarter |
| | 1 to 10 for Year |
| Report View | "M" = Market |
| | "P" = Portfolio |
| Account Type | blank = All |
| | "A" = Retail Installment |
| | "B" = Home Equity Loan |
| | "C" = Auto Loan |
| | "D" = Auto Lease |
| | "E" = Bank Installment |
| | "F" = All Other Installments |
| | "G" = Bankcard |
| | "H" = Home Equity Line of Credit |
| | "I" = Retail Revolving |
| | "J" = All Other Revolving |
| | "K" = Mortgage |
| | "L" = Collections Installment |
| | "M" = Collections Revolving |
| | "N" = Collections Other |
| Account Condition | blank = All |
| | "1" = Open |
| | "2" = Closed |
| Account Distinction | blank = All |
| | "1" = New |
| | "2" = Existing |
| Peer Industry Group | blank = All |
| | "0" = Other |
| | "1" = National Banks |
| | "2" = Other Banks |
| | "3" = Credit Unions |
| | "4" = Finance |
| | "5" = Retail |
| | "6" = Auto |
| | "7" = Mortgage |
| | "8" = Student Loans |
| | "9" = Collections |

-continued

| Query Selection Options | Query Selection Values | |
|---|---|---|
| Geography Type | "N" = National<br>"R" = Regional<br>"S" = State<br>"M" = MSA | |
| Number of Geographic areas | 1 for National<br>1-4 for Regional (present list)<br>1-50 for State (present list)<br>1-300 for MSA (present list) | |
| Consumer Score Classification | blank = All<br>"A" = 740+<br>"B" = 720-739<br>"C" = 700-719<br>"D" = 680-699<br>"E" = 660-679<br>"F" = 640-659<br>"G" = 620-639<br>"H" = 600-619<br>"I" = 580-599<br>"J" = 560-579<br>"K" = 540-559<br>"L" = 520-539<br>"M" = <520 | OR    Super Prime (740+)<br>Prime (680-739)<br>Near Prime (620-679)<br>Sub Prime (<620) |
| Bankruptcy Attribute | blank = Don't select<br>"Y" = Select | |
| Inquiry Attribute - Auto | blank = Don't select<br>"Y" = Select | |
| Inquiry Attribute - Bankcard | blank = Don't select<br>"Y" = Select | |
| Inquiry Attribute - Mortgage | blank = Don't select<br>"Y" = Select | |
| Inquiry Attribute - Installment | blank = Don't select<br>"Y" = Select | |
| Inquiry Attribute - Other | blank = Don't select<br>"Y" = Select | |
| Delinquency Attribute | blank = Don't Select<br>"1" = Current<br>"2" = 30 Days Past Due<br>"3" = 30+ Days Past Due<br>"4" = 60 Days Past Due<br>"5" = 60+ Days Past Due<br>"6" = 90 Days Past Due<br>"7" = 90+ Days Past Due<br>"8" = 120 to 180 Days Past Due<br>"9" = Severe Derog Charge Off | |
| BTL Attribute | blank = Don't Select<br>"1" = BTL 0% to 25%<br>"2" = BTL > 25%<br>"3" = BTL 26% to 50%<br>"4" - BTL > 50%<br>"5" = BTL 51% to 75%<br>"6" = BTL > 75%<br>"7" = BTL 76% to 100%<br>"8" = BTL > 100% | |
| Maturity Attribute | Blank = Don't select<br>"A" = Maturing in < 6 Months<br>"B" = Maturing in 1 Year<br>"C" = Maturing in 2 Years<br>"D" = Maturing in 5 Years<br>"E" = Maturing in > 5 Years | |
| Balance Amount Attribute | Value depends upon value of Acct Type<br>Blank = Don't select<br>"A" = $0-$1,500 for "A-F", "L-N" value<br>"B" = $1,501-$6,000 for "A-F", "L-N" value<br>"C" = $6,001-$12,000 for "A-F", "L-N" value<br>"D" = $12,001-$17,000 for "A-F", "L-N" value<br>"E" = $17,001-$24,000 for "A-F", "L-N" value<br>"F" = $24,001+ for "A-F" value, "L-N" value<br>"G" = $0-$200 for "G-J" value<br>"H" = $201-$400 for "G-J" value<br>"I" = $401-$750 for "G-J" value<br>"J" = $751-$1,400 for "G-J" value<br>"K" = $1,401-$3,000 for "G-J" value<br>"L" = $3,001-$6,500 for "G-J" value<br>"M" = $6,501+ for "G-J" value<br>"N" = $0-$75,00 for "K" value<br>"O" = $75,001-$125,000 for "K" value<br>"P" = $125,001-$180,000 for "K" value | |

-continued

| Query Selection Options | Query Selection Values |
|---|---|
| | "Q" = $180,001-$255,000 for "K" value |
| | "R" = $255,001+ for "K" value |
| Loan Amount Attribute | Value depends upon value of Acct Type |
| | Blank = Don't select |
| | "A" = $0-$1,500 for "A-F", "L-N" value |
| | "B" = $1,501-$6,000 for "A-F", "L-N" value |
| | "C" = $6,001-$12,000 for "A-F", "L-N" value |
| | "D" = $12,001-$17,000 for "A-F", "L-N" value |
| | "E" = $17,001-$24,000 for "A-F", "L-N" value |
| | "F" = $24,001+ for "A-F", "L-N" value |
| | "G" = $0-$750 for "G-J" value |
| | "H" = $751-$1,500 for "G-J" value |
| | "I" = $1,501-$3,500 for "G-J" value |
| | "J" = $3,501-$7,000 for "G-J" value |
| | "K" = $7,001-$11,000 for "G-J" value |
| | "L" = $11,001-$15,000 for "G-J" value |
| | "M" = $15,001+ for "G-J" value |
| | "N" = $0-$85,00 for "K" value |
| | "O" = $85,001-$130,000 for "K" value |
| | "P" = $130,001-$180,000 for "K" value |
| | "Q" = $180,001-$255,000 for "K" value |
| | "R" = $255,001+ for "K" value |

In one embodiment, as illustrated in FIG. 1, the system also allows the user to save one or more queries. The user can later select a saved query in order to edit or run the saved query.

In one advantageous embodiment, the system performs a query as follows. The system determines the population and the population segment, both of which are based on user input. The population and population segment determines the specific trade records that count as part of the query. For percentage calculations, each trade (for portfolio views) or each consumer (for market views) that falls within the population and population segment is counted as part of the denominator for the calculation. Within the population and population segment, each trade or each consumer that falls within the population and population segment and also meets the criteria specified in the attributes is counted as part of the numerator for the calculation. The numerator is divided into the denominator and the result is multiplied by 100 to produce a percentage of trades or consumers that meet the criteria within the population or population segment. Advantageously, such calculations can be performed from raw, codified credit data where each trade in the data set is individually represented. Each query produces a custom calculation that allows for the aggregation of trade level data to build into a unique population and sub-population from which the final calculations are made. In one advantageous embodiment, each query can be performed and reported to the user within 12 hours. For example, in one embodiment, the user enters the query, the system calculates the query, and within 12 hours the system notifies the user, such as through an email message, that the query has completed. Upon notification, the user can log in to the system in order to access the results of the query. Alternatively or additionally, the system can be configured to transmit the query results to the user, such as in an email message.

Additional details regarding query generation in one particular embodiment of the system are described in Appendix A of the provisional application whose disclosure has been incorporated by reference in its entirety into this application.

FIGS. 2-7B illustrate examples of results that can be generated by the system in response to example queries. FIG. 2 illustrates generated query results for a query that requests the percentage of open bankcard trades for super prime risk group in California with 30 plus days delinquency. FIG. 3 illustrates generated query results for a query that requests the percentage of open bankcard trades for super prime risk group in several selected states with 30 plus days delinquency. FIG. 4 illustrates generated query results for a query that requests the percentage of consumers with open mortgage trades at national banks for the prime risk group maturing in 1 year. FIG. 5 illustrates generated query results for a query that requests the percentage of consumers with open mortgage trades at national banks for the prime risk group maturing in 1 year, with the population segmented into four regions. FIG. 6 illustrates generated query results for a query that requests the percentage of open home equity line of credit trades at national banks for the prime risk group with a balance-to-loan between 26% and 50%. Furthermore, FIG. 6 illustrates the comparison of market aggregate data with data about the client's portfolio. FIGS. 7A and 7B illustrate generated query results for a more complex query that requests the percentage of open home equity line of credit trades at national banks for the prime risk group with a balance-to-loan between 26% and 50% and also illustrates the comparison of market aggregate data with data about the client's portfolio.

FIGS. 4-7B also illustrate another optional feature included in some embodiments that allow peer group selection. Namely, in some embodiments, the system identifies to the user the top ten peers that are associated with results in the query. In one embodiment, in order to preserve confidentiality and to prevent a user from getting detailed knowledge about a specific peers' portfolios by using the system, the system displays the top ten peers in alphabetical order without revealing the individual market share of each peer or including any detailed information about each peer. In one embodiment, if there are not at least ten peers associated with results in the query, the system does not display the names of any peers. This, too, prevents a user from obtaining information about a specific peer's portfolio.

Figure 8B:
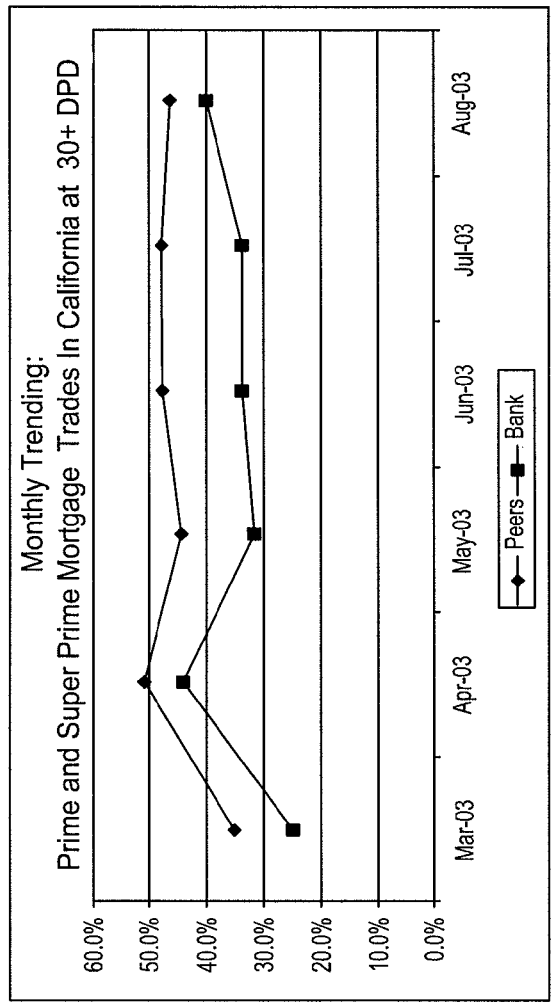

FIGS. 8A and 8B illustrate a build example for a peer group query. The use of peer groups in the portfolio benchmarking system is discussed below in more detail. As illustrated, each query parameter limits the scope of the raw trade level data set being queried, essentially "zeroing in" on the results of the query on a unique population, based on user selections for all input values.

As discussed below, in one embodiment, the initial set of data is a set of pre-merged consumer data 904 and trade data 906. This pre-merged data is stored on the portfolio benchmarking system allowing fast access to consumer data 904 and trade data 906 and does not require the steps of having to join and process separately stored consumer data 904 and trade data 906. Thus, in one embodiment, the circle labeled "All Trades" represents the pre-merged consumer data 904 and trade data 906 and is readily available to the user.

In addition, the circle labeled "All Trades" represents a data set that includes all trades in the United States. A skilled artisan will appreciate that the "All Trades" data set is the set that would be queried if the user entered no parameters at all for defining the account type in the query population. The circle labeled "Open 1st Mortgage trades" represents a data set that includes only open 1st mortgage trades. As illustrated, the "Open 1st mortgage trades" data set is a subset of the "all trades" data set. Accordingly, by defining the trade account type as "$1^{st}$ Mortgage," the user has limited the population of data that is to be queried.

Further, by refining the selections to only "Open" mortgage trades and additionally selecting those trades associated only with "National Banks" as a peer group selection, the user may designate a subset of the "open first mortgage trades" data set. Further definition of the trade data set as only those in the state of California may define another subset of "Open 1st Mortgage trades" data set. This subset would not necessarily be a subset of the open $1^{st}$ mortgage trades within the "National Banks" peer group data set. The "Open $1^{st}$ Mortgage trades with a risk score of 680+" further limits the population for the query. Indeed, in this case, the "$1^{St}$ Mortgage trades with a risk score of 680+ in the state of California" is the population for the query and from this data set is calculated the denominator of a percentage based calculation.

Those qualified trades that are further defined as those that exhibit the attributes of 30+ days past due and have a balance-to-loan utilization rate of greater than 75% represent the data set that falls within the defined population and that meets the attributes 30+ days past due and balance-to-loan greater than 75% attributes. From this data set is calculated the numerator of a percentage based calculation. In this example, these data sets are used to calculate the illustrated table of percentages and the illustrated graphs of percentages on FIGS. 8A and 8B.

Figure 9:
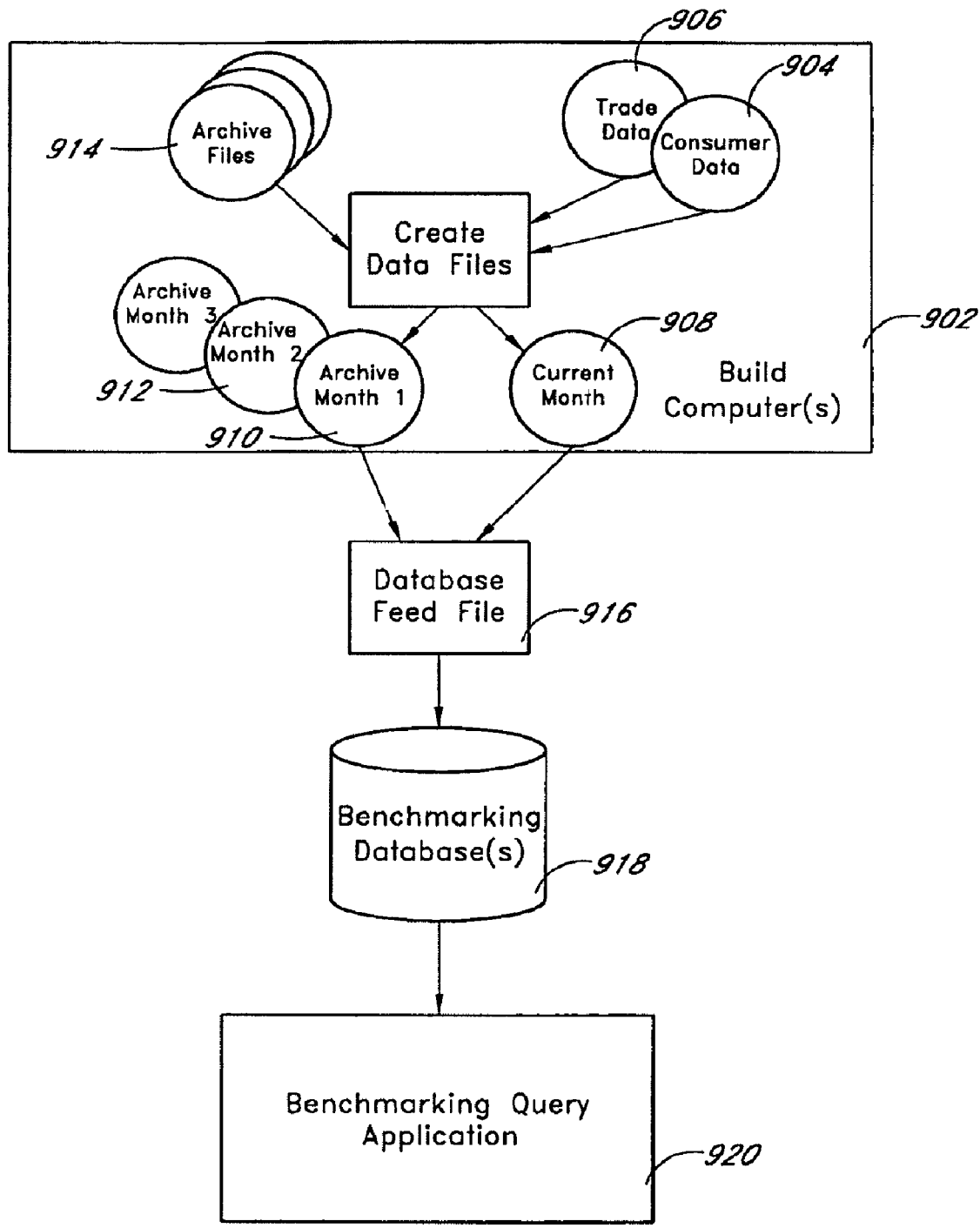
FIG. 9 is a block diagram that illustrates an embodiment of the portfolio benchmarking system.

FIG. 9 is a block diagram that illustrates an embodiment of the portfolio benchmarking system. In one embodiment, one or more build computers 902 create data files, relying on consumer data 904 and trade data 906. The consumer data 904 and trade data 906 comprise records regarding the status of consumer credit histories and trade information. The consumer data's records are focused on consumers and include information about all trades associated with the consumer. The trade data's records are focused on individual trades. In one embodiment, the build computer 902 creates data files that represent sets of merged consumer data 904 and trade data 906 as discussed below in more detail.

In one embodiment, the build computer 902 creates data files periodically according to a predetermined build cycle. In one embodiment, the build cycle occurs on the $7^{th}$ day of each month. In each build cycle, the system creates a current month data file 908.

The current month data file 908 includes a statistical sampling of the consumer data and the trade data representing the status of each trade or consumer file as of the last day of the preceding month. That is, if the build cycle occurs on January $7^{th}$, the build computer 902 builds a current month file 908 that includes the status of the trades and the consumer files as of December $31^{st}$. In one embodiment, attributes that changed during the current month (December for example) are recorded as the worst status achieved during the month. For example, if a trade was 31 days past due on December 15 but was paid in full on December 16, the trade may be classified, for statistical purposes, as 30+ days past due. Alternatively, the attributes can simply be a snapshot of the status on the last day of the month, such that any trade fully paid on December 31 may not be classified as 30 days past due even if it was 30 days past due during part of the month.

As indicated, during a build cycle, the build computer 902 creates current month data 908 by recording a statistical sampling of the trade data and the consumer data as of the last day of the preceding month. In one embodiment, the number of records that are included in the statistical sampling is 20% of the total available records. In alternative embodiments, the size of the statistical sample can be greater or lower. For example, the number of records in included in the statistical sample can be at least 20% of the total available records, or at least 18%, 16%, 14%, 12%, 10%, or more than 8%, of the total available. Advantageously, providing for a large sample size increases the chances that any query restricted to a narrow population will nonetheless be performed on a sample size that is statistically significant. Accordingly, providing for a large sample size generally increases the accuracy and reliability of the system's results.

During a build cycle at the start of a new quarter or new year, the system also builds statistically sampled data sets for the quarter just ended or for the year just ended. For example, on a January $7^{th}$ build cycle, the system builds a data set, in addition to the current month data set as of December $31^{st}$, a $4^{th}$ quarter data set for the previous year and a yearly data set for the entire previous year. In one embodiment, quarterly and yearly data sets' attributes are set such that each trades' or consumers' data reflects the worst status that occurred in the data during the quarter or year. Alternatively or additionally, certain attributes can be configured to represent that best status that occurred, the average status that occurred, or a status snapshot of the status on a particular day.

In one embodiment, each data set that is built by the build computer 902 is stored together with a time stamp indicating when the data set was generated. Each data set is stored for a period of time in order to allow for the generation of historical and trending reports. For example, at the next build cycle, the current month data set 908, which was stored with a time stamp, becomes the archive month 1 data set 910, the archive month 1 data set 910 becomes the archive month 2 data set 912, and so on. In one embodiment, 24 monthly data sets (2 years) are stored, 20 quarterly data sets (5 years) are stored, and 10 yearly data sets (10 years) are stored. A skilled artisan will appreciate, in light of this disclosure, that a larger number of historical archive data sets 914 can be stored or a fewer number of historical archive data sets 914 can be stored.

From the current month data set 908 and the historical archive data sets 914, the system in one embodiment produces one or more database feed files 916 and one or more benchmarking databases 918. The One or more benchmarking databases 918 provide the data that the user can query in order to receive portfolio benchmarking reports. The benchmarking databases 918 can be any database system managed by any database management system capable of handling the massive amounts of credit data to be queried and returning accurate query results within a time period deemed to be reasonable. Preferably, the system can manage credit data associated with tens of millions of consumers and hundreds of millions of trades. In one embodiment, the system manages credit data associated with at least 40 million consumers and at least 700 million trades. In one advantageous embodiment, the benchmarking databases 918 comprise or are in communication with a database and database management system as described in U.S. patent application Ser. No. 11/103,659, entitled "SYSTEMS AND METHODS FOR OPTIMIZING DATABASE QUERIES," which was filed on Apr. 11, 2005, the disclosure of which is hereby incorporated by reference in its entirety into this application.

The benchmarking query application 920, in one embodiment, is any user application configured to receive user queries, send user queries to the benchmarking database 918, receive responses from the benchmarking database 918, and display results to the user. In one embodiment, the benchmarking query application 920 is implemented as a web site that is served to a user browser by a web server over a network such as the Internet. Alternatively, the benchmarking query application 920 can be one or more software modules stored in a user computer that are configured to connect to a network in order to access the benchmarking database 918. As previously indicated, any software module could also be implemented as any combination of hardware, software, or firmware.

In preferred embodiments, the system advantageously generates data files, such as, for example, the current month data file 908, the archive month 1 data file 910, the archive month 2 data file 912, and the other archive data files 914, using a unique data format in which consumer level data and trade level data are combined. Advantageously, combining consumer level data and trade level data at build time allows the system to process queries much more quickly and efficiently than if the consumer level data and trade level data were joined at query run time, such as would be done in a typical relational database system.

FIG. 10 is a table that illustrates a number of records in which consumer level data and trade level data are combined in the unique manner discussed above. As shown, a consumer ("Cons") field 1002 identifies each record with a particular consumer. In the example table shown, the consumers identified in the consumer field 1002 include a consumer identified as consumer # 123 and a consumer identified as consumer # 456. Each record of the exemplary database also includes trade level data, including, for example, an account type 1004, an account condition 1006, an account amount 1008, an account balance 1010, and a peer group 1012. As each record includes both consumer information and trade information, without the need for joining consumer information with trade information at query run time, queries can be run more quickly and efficiently.

As set forth above, in one embodiment, the portfolio benchmarking system utilizes consumer data 904 in combination with trade data 906. Consumer data 904 may include, for example, name, phone number, address, state, zip code, credit score, and so forth. Trade data 906 may include, for example, account name, account status, amount, balance, delinquency, and so forth. Data for these sets of data come from different sources and are typically stored separately. Thus, each time a user runs a portfolio benchmarking query, the data must be merged and processed before the query has been applied. The process of merging hundreds of millions of records can be very time consuming. As an alternative, specific attributes may be pre-aggregated and calculated based on those data sets. These specific attributes, however, may not include the data the user wants and can not be customized in real-time by the user.

In one embodiment, the portfolio benchmarking system pre-merges consumer data 904 and trade data 906 on a periodic basis. This pre-merged data is then stored on the portfolio benchmarking system allowing fast access to consumer data 904 and trade data 906. In addition, users have the ability to apply their query to a custom subset of the pre-merged data thereby enabling the user to use custom and unique query criteria and the system to calculate attribute values in real-time at the time of the query. Accordingly, as users change their query criteria, they receive different calculated attribute values.

FIG. 10 illustrates one embodiment of a set of pre-merged data. While FIG. 10 provides one embodiment of one set of pre-merged data, it is recognized that a variety of sets of data may be included such that different and/or additional parameters or fields may be used in addition to and/or instead of one or more shown in the illustrated example. In addition, it is also recognized that the pre-merged data may include more than five entries, such as, for example, thousands, millions, or billions of entries.

Using the portfolio benchmarking system, a user can run various queries on the table. For example, the user could run Query 1 as below:

Query 1:
All (new and existing), Open Bankcards on National Bank peers with a score of >680, National (all geographies) that have a Balance-to-Loan utilization rate (BTL)>50%

The query calculation would then include only entry 1 in the base population as qualifying for the final aggregation. Moreover, any calculations for the query would be performed on entry 1 and not all five entries. This provides the user with the ability to define a custom base population in real time. In addition, because the customer data 904 and the trade data 906 had been pre-merged into a data set, the user would be able to receive a response much faster than if the consumer data 904 and the trade data 906 first had to be merged and processed before the query could be run.

In addition, the user could run a second query using a different set of criteria shown as Query 2 below.

Query 2:
All (new and existing), Open Bankcards on National Bank peers for all scores, National (all geographies) that have a BTL>50%

The query calculation would then include only entries 1 and 5 in the base population as qualifying for the final aggregation creating a different result than Query 1 above.

The user could then run a third query using a different set of criteria shown as Query 3 below.

Query 3:
All (new and existing) and Open and Closed Bankcards on any peer for all scores,
National (all geographies) that have a BTL>50%

The query calculation would then include only entries 1, 4 and 5 in the base population as qualifying for the final aggregation creating a different result than Query 1 and Query 2 above.

As illustrated in the example, by using the pre-merged data, the user is able to define custom base populations in real time.

While the pre-merged data is useful to some users, some users may want to utilize the portfolio benchmarking system to run queries that compare his or her company with other companies that are in the same peer group. Accordingly, in one embodiment, the pre-merged data includes data that categorizes the data into one or more peer groups. The user can then submit queries that select, in real-time, one or more peer groups to include and the query is then run that subset of data. The use of peer groups is useful to users because it allows users to benchmark a portfolio against a competitive peer group in real-time.

The table discussed above illustrates a peer group for financial institutions including: All, Other, National Banks, Other Banks, Credit Unions, Finance, Retail, Auto, Mortgage, Student Loans, and Collections. While the table shows eleven members of a peer group relating to financial institutions, it is recognized that a variety of different peer groups may be used and that the number of groups and/or members in a group may vary.

In addition, users can run multiple custom queries using the same or different peer groups. By selecting a peer group, the population for the query is narrowed to only the data that is relevant to that peer group. In addition, the user can create a query that limits the population to various combinations of peer groups and other data such as, for example, peer group, account type, region, score, and so forth. It is recognized that a variety of subsets of data may be created.

For example, without peer groups, a user may run a query on the data and receive information on the top 10 financial institutions in the United States. By limiting a first query to National Banks in California, the user may receive a completely different set of results. In addition, by limited a second query to National Banks in Texas, the user may receive a third unique set of results. By narrowing the population to a more-relevant data set, the user is able to perform more accurate comparisons.

A skilled artisan will appreciate, in light of this disclosure, that the embodiments of the systems and methods described herein provide an advantageous way to provide credit market information such that clients can research trends and current conditions in the credit market or submarkets of the credit market. Advantageously, the systems and methods described herein access massive amounts of raw data, generate responses to queries, and transmit those responses to users in a reasonable time period. Furthermore, optional features allow users to focus on particular market segments or credit products offered by industry peers. These and other advantages will be apparent to a skilled artisan in light of this disclosure.

While preferred embodiments have been described, a skilled artisan will appreciate that the invention is not limited to the preferred embodiments. Rather, the invention can encompass any new, useful, and non-obvious embodiment described herein or which would be apparent to a skilled artisan in light of this disclosure.

What is claimed is:

1. A credit portfolio benchmarking system comprising:
   a repository of trade data comprising a plurality of data items regarding trade lines including data for one or more loans;
   a repository of consumer data comprising a plurality of data items regarding consumers including one or more names, addresses, and credit scores, wherein at least some information in the consumer data is private data that is confidential to the consumers and not in the trade data and at least some information in the trade data is not in the consumer data;
   a build computer programmed to periodically generate at least one data file comprising a plurality of data items, each data item including a combination of information from the trade data and the consumer data obtained by merging trade line data with associated consumer data so that the trade line data and consumer data are in a same table and the merged data includes data that categorizes the data into one or more peer groups of lending institutions; and
   a benchmarking query application configured to communicate with the build computer to create a user input component display that comprises:
   a query build portion configured to receive user-entered values for parameters of a query; and
   an active query build portion configured to remain visible while the user builds a query and comprising hypertext links related to parameters of the query;
   the benchmarking query application further configured to execute queries using at least a portion of the at least one data file generated by the build computer and at least a portion of the user-entered values.

2. The system of claim 1, wherein the parameters are related to population definition, attribute selection, and population segmentation.

3. The system of claim 1, wherein the hypertext links of the active query build portion are configured to allow a user to navigate through screens of the user input component display.

4. The system of claim 1, wherein the hypertext links of the active query build portion are configured to allow a user to edit a previously-entered value for one or more of the parameters.

5. The system of claim 1, wherein the active query build portion displays at least one of: all of the user-entered values, a summary of the user-entered values, a subset of the user-entered values, and a representation of the user-entered values.

6. The system of claim 1, wherein the user input component display comprises multiple screens.

7. The system of claim 6, wherein the active query build portion remains visible in the multiple screens of the user input component display.

8. The system of claim 1, wherein the benchmarking query application is further configured to utilize a single window to present multiple screens in the window.

9. The system of claim 1, wherein the benchmarking query application is further configured to:
   receive user edits of values;
   determine whether the edited values affect other user-entered values;
   present the user with a screen associated with at least one of the user-entered values which are affected to allow further edits by the user.

10. A credit portfolio benchmarking system comprising:
    a benchmarking query application, executed on a computer system comprising one or more physical computers, configured to:
    create a user input component display that receives user-entered values for parameters, the user input component display comprising:
    a query build portion configured to receive user-entered values for parameters of a query; and
    an active query build portion configured to remain visible while the user builds during user entry of a query and comprising hypertext links related to the parameters;
    execute queries in at least near real time to retrieve information about a first lending institution using at least a portion of the user-entered values;
    determine peers of the first lending institution;
    determine respective credit portfolios of the first lending institution and the peers of the first lending institution; and
    generate an anonymized report that shows the credit portfolio of the first lending institution benchmarked against the peers of the first lending institution.

11. The system of claim 10, the anonymized report including a list of top peers of the peers competing for accounts of a particular type.

12. The system of claim 11, the list of top peers including a minimum number of peers such that portfolio characteristics regarding a specific peer are not determinable from the anonymized report so as to protect confidential information of the peers.

13. The system of claim 10, the user entered values relating to at least one of: a population definition, an attribute selection, and a population segmentation.

14. The system of Claim 13, the benchmarking query application further configured to execute the queries using the at least one of: a population definition, an attribute selection, and a population segmentation.

15. A non-transitory computer readable medium having computer executable code recorded therein, the computer executable code configured to cause a computer system to:
receive an indication of a first lending institution;
receive query parameters for querying a credit portfolio benchmarking database to create an anonymized credit portfolio benchmarking report, the query parameters relating to defining a query population, segmenting the population, and selecting attributes, the credit portfolio benchmarking database comprising pre-merged trade data and consumer data categorized into one or more peer groups of lending institutions, the trade data including one or more loans, and the consumer data including one or more consumer names, addresses, and credit scores, wherein at least some information in the consumer data is private data that is confidential to consumers; and
receive the anonymized credit portfolio benchmarking report that displays a credit portfolio of the first lending institution benchmarked against a set of lending institutions of the first lending institution's peer group based at least in part on the merged data.

16. The computer readable medium of claim 15, wherein the anonymized credit portfolio benchmarking report further displays a list of top peers in the peer group competing for accounts of a particular type.

17. The computer readable medium of claim 16, wherein the list of top peers includes a minimum number of peers such that portfolio characters of a specific peer are not known.

18. A credit portfolio benchmarking system comprising:
trade records regarding the status of trade information;
consumer records regarding the status of consumer credit histories;
a build computer programmed to periodically generate at least one data file comprising a plurality of data items categorized into one or more peer groups of lending institutions, wherein each data item includes trade records pre-merged with associated consumer records; and
a benchmarking query application configured to: execute queries in at least near real time to retrieve information about a first lending institution using user-entered values for parameters of population, population segmentation, and attribute selection and at least one of the plurality of data items generated by the build computer;
determine peers of the first lending institution using at least one of the plurality of data items;
determine respective credit portfolios of the first lending institution and the peers of the first lending institution using at least one of the plurality of data items; and
generate a report that shows the credit portfolio of the first lending institution benchmarked against the credit portfolios of the first lending institution's peers.

19. The system of claim 18, the benchmarking query application further configured to create a user input component display that receives user-entered values for parameters, wherein the user input component display comprises an active query build portion configured to remain visible during user entry of a query and comprising hypertext links related to the parameters.

20. The system of claim 19, wherein the hypertext links of the active query build portion are configured to allow a user to edit a previously-entered value for one or more of the parameters.

21. The system of claim 18, wherein the benchmarking query application is further configured to: receive user edits of values; determine whether the edited values affect other user-entered values; present the user with a screen associated with at least one of the user-entered values which are affected, to allow further edits by the user.

* * * * *

UNITED STATES PATENT AND TRADEMARK OFFICE
CERTIFICATE OF CORRECTION

| | | |
|---|---|---|
| PATENT NO. | : 7,904,367 B2 | Page 1 of 1 |
| APPLICATION NO. | : 12/718701 | |
| DATED | : March 8, 2011 | |
| INVENTOR(S) | : Charles S. Chung et al. | |

It is certified that error appears in the above-identified patent and that said Letters Patent is hereby corrected as shown below:

At column 15, line 31, please delete "$1^{St}$", and insert -- $1^{st}$ --, therefor.

At column 15, lines 60-61, please remove paragraph break between lines 60 and 61 so that the two associated paragraphs are combined into a single paragraph.

Signed and Sealed this
Twenty-seventh Day of September, 2011

David J. Kappos
*Director of the United States Patent and Trademark Office*